(12) United States Patent
Takasaki (10) Patent No.: US 9,334,064 B2
(45) Date of Patent: May 10, 2016

(54) TORQUE ESTIMATION APPARATUS FOR VERTICAL TAKE-OFF AND LANDING AIRCRAFT, VERTICAL TAKE-OFF AND LANDING AIRCRAFT, TORQUE ESTIMATION PROGRAM FOR VERTICAL TAKE-OFF AND LANDING AIRCRAFT, AND TORQUE ESTIMATION METHOD FOR VERTICAL TAKE-OFF AND LANDING AIRCRAFT

(71) Applicant: MITSUBISHI HEAVY INDUSTRIES, LTD., Tokyo (JP)

(72) Inventor: Tetsuya Takasaki, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 14/374,399

(22) PCT Filed: Mar. 14, 2013

(86) PCT No.: PCT/JP2013/057266
§ 371 (c)(1),
(2) Date: Jul. 24, 2014

(87) PCT Pub. No.: WO2013/146315
PCT Pub. Date: Oct. 3, 2013

(65) Prior Publication Data
US 2014/0379177 A1 Dec. 25, 2014

(30) Foreign Application Priority Data
Mar. 29, 2012 (JP) ................. 2012-077012

(51) Int. Cl.
*B64D 45/00* (2006.01)
*B64C 27/04* (2006.01)
(Continued)

(52) U.S. Cl.
CPC .............. *B64D 45/00* (2013.01); *B64C 27/04* (2013.01); *B64C 29/00* (2013.01); *B64D 31/06* (2013.01);
(Continued)

(58) Field of Classification Search
CPC ............... G01L 5/133; F05D 2220/90; F05D 2220/329; B64C 27/04; B64C 29/00; B64D 31/06; B64D 45/00; F02C 9/00; G01C 23/00; G05D 1/0669; G05D 1/0653
See application file for complete search history.

(56) References Cited

U.S. PATENT DOCUMENTS 4,736,331 A  4/1988 Lappos et al.
4,780,838 A  10/1988 Adelson
(Continued)

FOREIGN PATENT DOCUMENTS

GB  000889024 A  *  2/1962
JP  61-211199  9/1986
(Continued)

OTHER PUBLICATIONS

International Search Report issued Jun. 18, 2013 in International Application No. PCT/JP2013/057266.
(Continued)

*Primary Examiner* — Rodney Butler
(74) *Attorney, Agent, or Firm* — Wenderoth, Lind & Ponack, L.L.P.

(57) ABSTRACT

A torque estimation apparatus (12) of a helicopter (10) stores in a storage apparatus (14) a measurement point that is a measured value of the torque of an engine (28) with respect to a measured value of an engine performance parameter that relates to performance of the engine that rotates a rotor (26) together with a time at which the measurement point is measured, generates an approximate expression based on the measurement point that is stored in the storage apparatus (14), and estimates the amount of a utilizable torque based on the generated approximate expression.

12 Claims, 9 Drawing Sheets

(51) Int. Cl.
*B64D 31/06* (2006.01)
*F02C 9/00* (2006.01)
*G01L 5/13* (2006.01)
*B64C 29/00* (2006.01)

(52) U.S. Cl.
CPC . *F02C 9/00* (2013.01); *G01L 5/133* (2013.01); *F05D 2220/329* (2013.01); *F05D 2220/90* (2013.01)

(56) References Cited

U.S. PATENT DOCUMENTS

| | | | | |
|---|---|---|---|---|
| 4,947,334 | A | * | 8/1990 | Massey et al. ................. 701/3 |
| 5,018,069 | A | * | 5/1991 | Pettigrew .................. F02C 9/00 701/31.6 |
| 5,065,349 | A | * | 11/1991 | Thomas ..................... 701/31.7 |
| 2003/0135305 | A1 | * | 7/2003 | Zagranski et al. ............ 701/3 |
| 2003/0135306 | A1 | * | 7/2003 | Driscoll et al. .............. 701/3 |
| 2006/0089761 | A1 | | 4/2006 | Pettigrew et al. |
| 2008/0161983 | A1 | * | 7/2008 | Salesse-Lavergne ............ 701/7 |
| 2011/0106388 | A1 | * | 5/2011 | Boeckenhoff et al. ......... 701/70 |
| 2012/0072130 | A1 | * | 3/2012 | Doleschel et al. ............. 702/41 |

FOREIGN PATENT DOCUMENTS

| | | |
|---|---|---|
| JP | 5-87438 | 12/1993 |
| JP | 10-16894 | 1/1998 |
| JP | 2001-253394 | 9/2001 |
| JP | 2003-137191 | 5/2003 |
| JP | 2003-160099 | 6/2003 |

OTHER PUBLICATIONS

Written Opinion of the International Searching Authority issued Jun. 18, 2013 in International Application No. PCT/JP2013/057266.

Decision to Grant a Patent issued Sep. 29, 2015 in corresponding Japanese patent application No. 2012-077012.

* cited by examiner

TORQUE ESTIMATION APPARATUS FOR VERTICAL TAKE-OFF AND LANDING AIRCRAFT, VERTICAL TAKE-OFF AND LANDING AIRCRAFT, TORQUE ESTIMATION PROGRAM FOR VERTICAL TAKE-OFF AND LANDING AIRCRAFT, AND TORQUE ESTIMATION METHOD FOR VERTICAL TAKE-OFF AND LANDING AIRCRAFT

TECHNICAL FIELD

The present invention relates to a torque estimation apparatus for a vertical take-off and landing aircraft, a vertical take-off and landing aircraft, a torque estimation program for a vertical take-off and landing aircraft, and a torque estimation method for a vertical take-off and landing aircraft.

BACKGROUND ART

In order to maintain the rotation speed of a rotor and continue flying, a vertical take-off and landing aircraft such as a helicopter must constantly obtain a torque (hereunder, referred to as "utilizable torque") that is equal to or greater than a torque required to rotate the rotor (hereunder, referred to as "required torque") from an engine.

In this regard, PTL 1 describes a method that, automatically calculates a motive power necessary for stopping flight of a helicopter as well as the utilizable maximum motive power in a manner that takes into consideration deterioration of a rotor system in the helicopter, deterioration or failure of an engine, and the current atmospheric conditions and flying weight, and displays the values in contrast with each other to the pilot of the helicopter. According to the method described in PTL 1, since the relation between the motive power that is required for stopping flight and the maximum motive power that is currently utilizable is displayed on an indicator, the pilot can determine whether or not it is possible to stop flight of the helicopter. In this case, in PTL 1, a method is described in which the maximum motive power that is currently utilizable is calculated based on operating parameters of the engine by a calculation that uses an engine model or the like.

CITATION LIST

Patent Literature

{PTL 1}
Japanese Examined Patent Application, Publication No. Hei 5-87438

SUMMARY OF INVENTION

Technical Problem

However, in the case of flying a vertical take-off and landing aircraft in an environment in which there is a possibility that adherents will accumulate on the rotor blade and the required torque will increase or, for example, the performance of an engine such as a gas turbine engine will rapidly decline due to the engine drawing in impurities or the like, it is difficult for the pilot to ascertain the situation concerning the aircraft in real time. Here, the term "impurities" refers to, for example, seawater spray or volcanic ash. For example, if a gas turbine engine draws in such impurities, the impurities attach to blade cascades inside the gas turbine engine and cause the performance of the gas turbine engine to deteriorate within a short time period. When it is attempted to calculate the performance of the engine with sufficient accuracy in such a state that is not a normal state, in many cases the result is not in accordance with a theoretical value, and it is generally difficult to estimate the engine performance. Even if a calculation means that has sufficient accuracy is available, as described in PTL 1, it is necessary to detect detailed operation parameters such as the temperature and pressure inside the engine to calculate the engine performance. However, there are few vertical take-off and landing aircrafts that are equipped with all the detection devices and the like inside the engine that are required for obtaining sufficient information for calculating the utilizable torque.

Further, in a case where a pilot is busy with operations to fly the vertical take-off and landing aircraft and also perform other work, and thereafter performs a flying operation that requires a large amount of torque, it is even more difficult for the pilot to estimate the utilizable torque that will enable such a flying operation and to predict whether or not the vertical take-off and landing aircraft produces the relevant amount of torque.

The present invention has been made in consideration of the above described situation, and an object of the present invention is to provide a torque estimation apparatus for a vertical take-off and landing aircraft, a vertical take-off and landing aircraft, a torque estimation program for a vertical take-off and landing aircraft, and a torque estimation method for a vertical take-off and landing aircraft that, regardless of abrupt variations in the engine performance, can easily estimate in real time the amount of a utilizable torque based on limited engine performance parameters.

Solution to Problem

To solve the above problems, the torque estimation apparatus for a vertical take-off and landing aircraft, vertical take-off and landing aircraft, torque estimation program for a vertical take-off and landing aircraft, and torque estimation method for a vertical take-off and landing aircraft of the present invention adopt the following solutions.

A torque estimation apparatus for a vertical take-off and landing aircraft according to a first aspect of the present invention includes: a storage apparatus that stores a measurement point that is a measured value of a torque of an engine with respect to a measured value of a parameter relating to performance of the engine that rotates a rotor, together with a time at which the measurement point is measured; a generation portion that generates an approximate expression based on the measurement point that is stored in the storage apparatus; and an estimation portion that estimates an amount of the torque that is utilizable based on the approximate expression that is generated by the generation portion.

According to the present configuration, a measurement point that is a measured value of a torque of an engine with respect to a measured value of a parameter relating to performance of the engine that rotates a rotor is stored by a storage apparatus together with a time at which the measurement point is measured. Preferably, the storage apparatus is non-volatile. The engine is, for example, a gas turbine engine, and the parameter is, for example, an engine outlet temperature, an engine speed, and a fuel flow rate or the like.

Further, an approximate expression is generated by a generation portion based on the measurement point stored in the storage apparatus, and the amount of a utilizable torque is estimated by an estimation portion based on the approximate expression that is generated.

Note that, in a case of measuring a plurality of kinds of parameters, an approximate expression is generated for each different parameter, and an amount of the utilizable torque is estimated for each approximate expression. Although a plurality of estimated values are thereby obtained with respect to the amount of the utilizable torque, for example, selection of a low value is performed to obtain a margin of safety.

Thus, the present configuration generates an approximate expression based on two kinds of information obtained from a vertical take-off and landing aircraft, namely information regarding the torque of the engine and information regarding a parameter relating to performance of the engine, and then estimates the amount of the utilizable torque. Therefore, the amount of the utilizable torque can be easily estimated in real time based on limited engine performance parameters, regardless of abrupt variations in the engine performance In the aforementioned first aspect, preferably, in a case where the measurement point with respect to which a measured value of the parameter is high relative to the approximate expression is newly obtained, the generation portion parallelly shifts the approximate expression based on the measurement point that is newly obtained.

According to the present configuration, in a case where a measurement point with respect to which a measured value of a parameter is high relative to the approximate expression is newly obtained, the approximate expression is parallelly shifted based on the newly obtained measurement point. The fact that a measured value of a parameter is high relative to the approximate expression indicates a decrease in the torque with respect to the parameter, that is, that the engine performance is declining. For example, in the case of a gas turbine engine, if seawater or volcanic ash or the like is drawn into the engine, there is a possibility that salt lumps or ash will attach to blade cascades inside the gas turbine engine and the engine performance will decline.

The slope of the approximate expression indicates the rate of change in the engine performance with respect to the parameter, and it is considered that the rate of change does not fluctuate significantly even if the engine performance changes. Therefore, by parallelly shifting the approximate expression based on a newly obtained measurement point, the present configuration can easily obtain an approximate expression that is in accordance with the decline in the engine performance.

In the aforementioned first aspect, preferably, in a case where the measurement point with respect to which a measured value of the parameter is low relative to the approximate expression is newly obtained consecutively for a predetermined number of times or more or for a predetermined time period or more, the generation portion parallelly shifts the approximate expression based on the measurement point that is newly obtained.

According to the present configuration, in a case where a measurement point with respect to which a measured value of the parameter is low relative to the approximate expression is obtained, the approximate expression is parallelly shifted based on the newly obtained measurement point. The fact that the measured value of the parameter is low relative to the approximate expression indicates an increase in the torque with respect to the parameter, that is, that the engine performance is being restored. For example, in the case of gas turbine engine, even if the engine performance declines due to the engine drawing in seawater or volcanic ash or the like, in some cases salt lumps or ash attached to blade cascades inside the gas turbine engine are washed off by fresh water such as rain that is drawn into the gas turbine engine, and consequently the engine performance is restored. Further, when maintenance work is performed on a vertical take-off and landing aircraft after landing, salt lumps or ash attached to the blade cascades inside the gas turbine engine is washed off to thereby restore the engine performance.

Note that, to exclude the possibility that restoration of the engine performance is a temporary event, the approximate expression is parallelly shifted in a case where a measurement point with respect to which a measured value of the parameter is low relative to the approximate expression is newly obtained consecutively for a predetermined number of times or more or for a predetermined time period or more.

Thus, the present configuration can easily obtain an approximate expression that is in accordance with restoration of the engine performance.

In the aforementioned first aspect, preferably, in a case where a predetermined number of the measurement points that are in accordance with the torque that is greater than the torque when the engine is in an idling state are obtained, the generation portion generates the approximate expression based on the measurement points.

According to the present configuration, in a case where a predetermined number of measurement points are obtained that are in accordance with a torque that is greater than a torque when the engine is in an idling state, an approximate expression is generated based on the measurement points. Since there is a possibility that a large error will arise in the case of an approximate expression that is generated based on only measurement points in an idling state or on a small number of measurement points, the amount of the utilizable torque cannot be estimated with a high degree of accuracy in such a case. Therefore, by generating an approximate expression based on a torque that is greater than a torque in an idling state or based on a predetermined number of measurement points with respect to which an error becomes sufficiently small, the present configuration can estimate the amount of the utilizable torque with a higher degree of accuracy. Note that, the term "torque that is greater than a torque in an idling state" refers to, for example, a torque of an amount that is equal to or greater than the amount of a torque when a vertical take-off and landing aircraft is hovering in ground effect.

In the aforementioned first aspect, preferably, in a case where the predetermined number of the measurement points are not obtained, the generation portion parallelly shifts a predetermined approximate expression to the measurement point that is obtained.

According to the present configuration, in a case where a predetermined number of measurement points is not obtained, because an approximate expression cannot be generated, an approximate expression that is obtained by previous measurement or simulation of the engine performance is parallelly shifted to a measurement point that is obtained. Thus, the present configuration can estimate the amount of the utilizable torque even if a predetermined number of measurement points are not obtained.

In the aforementioned first aspect, preferably, for each of the torque amounts that are divided into a plurality of segments, the generation portion calculates an average value of a plurality of the measurement points for each predetermined time interval, and uses an average value with respect to which a measured value of the parameter is largest among average values of a same segment as a measurement point for generating the approximate expression.

According to the present configuration, torque amounts are divided into a plurality of segments, and an average value of a plurality of measurement points included in the respective segments is calculated for each predetermined time interval. The distribution of the measurement points is made uniform by averaging the measurement points for each of the plurality of segments in accordance with the amount of the torque. Further, even in the case of torque amounts in the same segment, the engine performance changes in accordance with differences in the relevant times, and variations arise among the measurement points. Therefore, an average value of measurement points is calculated for each predetermined time interval.

Further, even when the torque is the same, the higher that the measured value of a parameter is, the greater the decline in engine performance that is indicated thereby. Therefore, by using an average value with respect to which the measured value of a parameter is largest among average values of the same segment as a measurement point for generating an approximate expression, the approximate expression that is generated is an approximate expression that has a greater margin of safety.

Thus, the present configuration can generate an approximate expression which can estimate the amount of the utilizable torque with greater accuracy.

In the aforementioned first aspect, preferably the generation portion generates the approximate expression for each usage state of a load apparatus that is different to the rotor of the engine.

The torque of an engine varies depending on the load applied to the engine. According to the present configuration, since an approximate expression is generated for each usage state of a load apparatus that is different to the rotor of the engine, the amount of the utilizable torque can be estimated with higher accuracy.

In the aforementioned first aspect, preferably, in a case where the approximate expression that corresponds to a usage state of the load apparatus is updated, the generation portion also similarly updates the approximate expression that corresponds to another usage state of the load apparatus.

According to the present configuration, in a case where an approximate expression for a certain usage state of a load apparatus is updated by being parallelly shifted or the like, it is assumed that a similar trend exists with respect to a relation between the torque and the parameter for another usage state of the load apparatus, and therefore the approximate expression corresponding to another usage state of the load apparatus is similarly updated. It is thus possible to estimate the amount of the utilizable torque with higher accuracy.

In the aforementioned first aspect, preferably, in a case where the torque that increases to a higher level than in an idle state decreases to a level thereof in the idle state again, the generation portion resets the measurement point that is used to generate the approximate expression, and thereafter parallelly shifts the approximate expression based on the measurement point that is newly obtained.

When the torque of an engine that increases to a higher level than in an idle state decreases to the level thereof in the idle state again, it can be considered that a flight of a vertical take-off and landing aircraft has ended for the time being.

Therefore, according to the present configuration, in a case where torque that increased to a higher level than in an idle state decreased to the level thereof in the idle state again, a measurement point that is used to generate an approximate expression is reset. Consequently, the influence of a measurement point obtained in a previous flight is reduced with respect to a flight that will be newly started. However, the approximate expression is not reset. Note that, the term "resetting a measurement point" means that the measurement point is not used to generate an approximate expression, and does not mean that the measurement point is deleted from the storage portion.

Further, according to the present configuration, since the approximate expression that has not been reset is thereafter parallelly shifted based on a newly obtained measurement point, it is possible to quickly estimate the amount of the utilizable torque when a vertical take-off and landing aircraft starts a new flight.

In the aforementioned first aspect, preferably the torque estimation apparatus includes a notification portion that notifies information based on an amount of a torque that is utilizable that is estimated by the estimation portion to a pilot.

According to the present configuration, since information based on the estimated amount of a utilizable torque of the engine is notified to the pilot, the pilot can fly the vertical take-off and landing aircraft in accordance with the utilizable torque, and the safety of the vertical take-off and landing aircraft is thereby improved.

A vertical take-off and landing aircraft according to a second aspect of the present invention includes an engine that rotates a rotor, and a torque estimation apparatus that is described above.

A torque estimation program for a vertical take-off and landing aircraft according to a third aspect of the present invention causes a computer to function as: a reading portion that reads out a measurement point that is a measured value of a torque of an engine with respect to a measured value of a parameter relating to performance of the engine that rotates a rotor from a storage apparatus in which the measurement point is stored together with a time at which the measurement point is measured; a generation portion that generates an approximate expression based on the measurement point that is read out; and an estimation portion that estimates an amount of the torque that is utilizable based on the approximate expression that is generated by the generation portion.

A torque estimation method for a vertical take-off and landing aircraft according to a fourth aspect of the present invention includes: a first stage that stores a measurement point that is a measured value of a torque of an engine with respect to a measured value of a parameter relating to performance of the engine that rotates a rotor in a storage apparatus together with a time at which the measurement point is measured; a second stage that generates an approximate expression based on the measurement point that is stored in the storage apparatus; and a third stage that estimates an amount of the torque that is utilizable based on the approximate expression that is generated.

Advantageous Effects of Invention

According to the present invention, an amount of a utilizable torque can be easily estimated in real time based on limited engine performance parameters, irrespective of abrupt variations in the engine performance.

DESCRIPTION OF EMBODIMENTS

Hereunder, an embodiment of a torque estimation apparatus for a vertical take-off and landing aircraft, a vertical take-off and landing aircraft, a torque estimation program for a vertical take-off and landing aircraft, and a torque estimation method for a vertical take-off and landing aircraft according to the present invention is described with reference to the accompanying drawings.

Note that, in the present embodiment, a helicopter is described as one example of a vertical take-off and landing aircraft.

Figure 1:
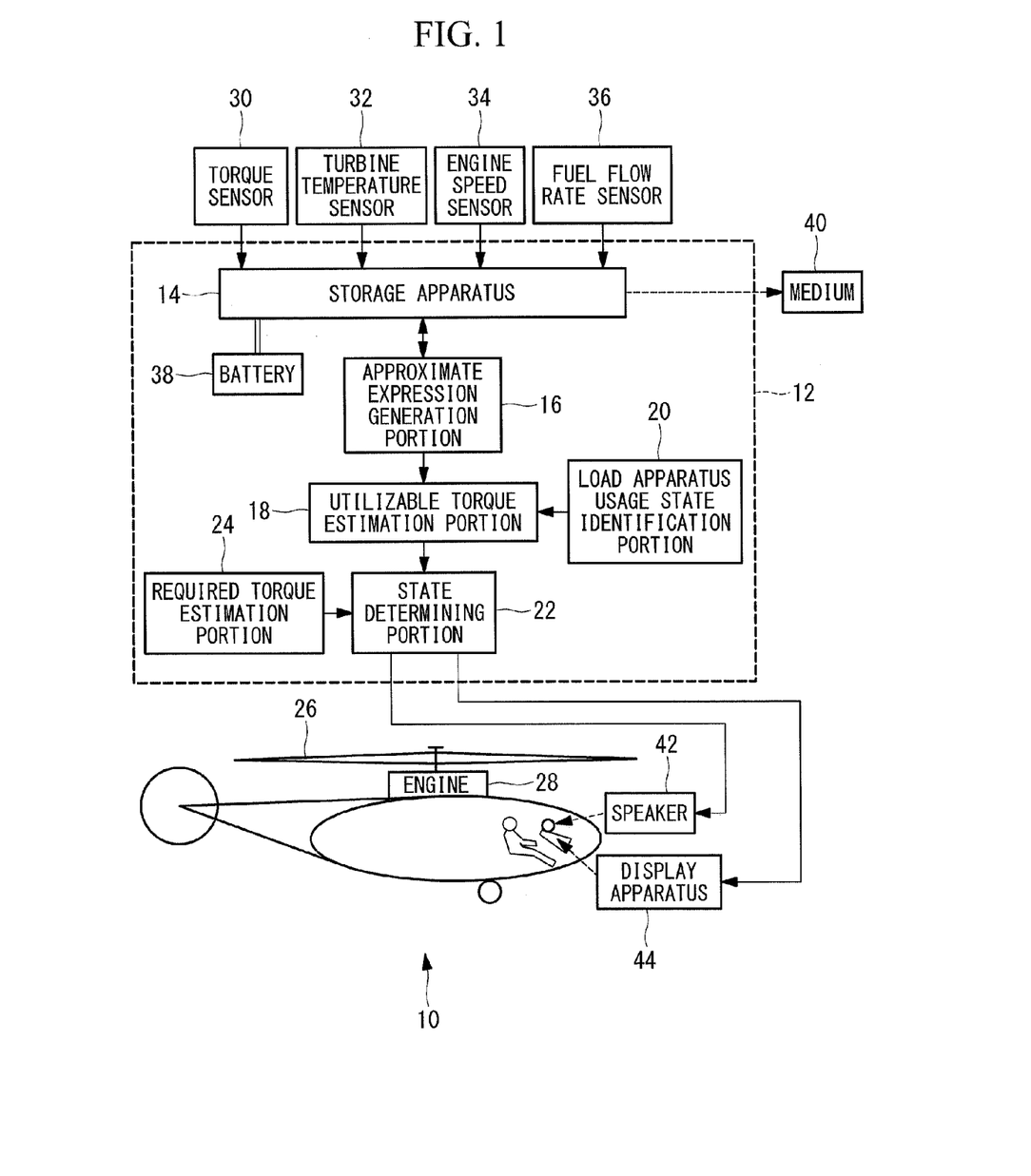
FIG. 1 is a configuration diagram illustrating a torque estimation apparatus of a helicopter according to an embodiment of the present invention.

FIG. 1 is a configuration diagram of a torque estimation apparatus 12 of a helicopter 10 according to the present embodiment.

The torque estimation apparatus 12 is provided in a control apparatus of the helicopter 10, and includes a storage apparatus 14, an approximate expression generation portion 16, a utilizable torque estimation portion 18, a load apparatus usage state identification portion 20, a state determining portion 22, and a required torque estimation portion 24.

It is assumed that an engine 28 that rotates a rotor 26 in the helicopter 10 of the present embodiment is a gas turbine engine.

The storage apparatus 14 stores a measurement point that is a measured value of a torque of the engine 28 with respect to a measured value of a parameter relating to the performance of the engine 28 (hereunder, referred to as "engine performance parameter"), together with a time at which the measurement point is measured. Engine performance parameters according to the present embodiment include an engine outlet temperature (exhaust gas temperature) as a turbine temperature, an engine speed, a fuel flow rate or the like.

A torque sensor 30 that measures the amount of the torque of the engine 28, a turbine temperature sensor 32 that measures the turbine temperature, an engine speed sensor 34 that measures the engine speed, and a fuel flow rate sensor 36 that measures a fuel flow rate are provided according to the present embodiment. Values measured by the respective sensors are stored in the storage apparatus 14.

That is, as measurement points, the storage apparatus 14 stores a turbine temperature with respect to the torque, an engine speed with respect to the torque, and a fuel flow rate with respect to the torque together with the measurement times. In most kinds of the engine 28, and not only a gas turbine engine, the torque that can be utilized (hereunder referred to as "utilizable torque") is restricted by the engine outlet temperature, the engine speed, and the fuel flow rate. The utilizable torque is, in other words, the maximum value of a torque which the engine 28 can generate.

A nonvolatile storage apparatus is adopted as the storage apparatus 14. In the present embodiment, the storage apparatus 14 is connected to a battery 38 that supplies power thereto. Consequently, even if the power of the aircraft is turned off, it is possible for data to be read out to an external medium 40 from the storage apparatus 14, and maintenance personnel can utilize the data when performing maintenance of the helicopter 10.

The approximate expression generation portion 16 generates an approximate expression based on a measurement point stored in the storage apparatus 14.

The utilizable torque estimation portion 18 estimates the amount of a utilizable torque based on an approximate expression generated by the approximate expression generation portion 16.

The load apparatus usage state identification portion 20 identifies a usage state of a load apparatus of the engine 28 other than the rotor 26 (for example, an air conditioner or an anti-icing apparatus).

The state determining portion 22 determines whether or not the state is one in which the estimated utilizable torque is sufficient for providing the torque that is required (hereunder referred to as "required torque") for hovering (including a time of landing, at which the flying speed is 0 km). Further, the state determining portion 22 notifies the result of the determination to various notification apparatuses such as a speaker 42 and a display apparatus 44 that are provided in a cockpit.

The required torque estimation portion 24 estimates the weight of the helicopter 10 and the required torque based on the outside air temperature, the altitude, the speed and the torque while the helicopter 10 is flying.

Figure 2:
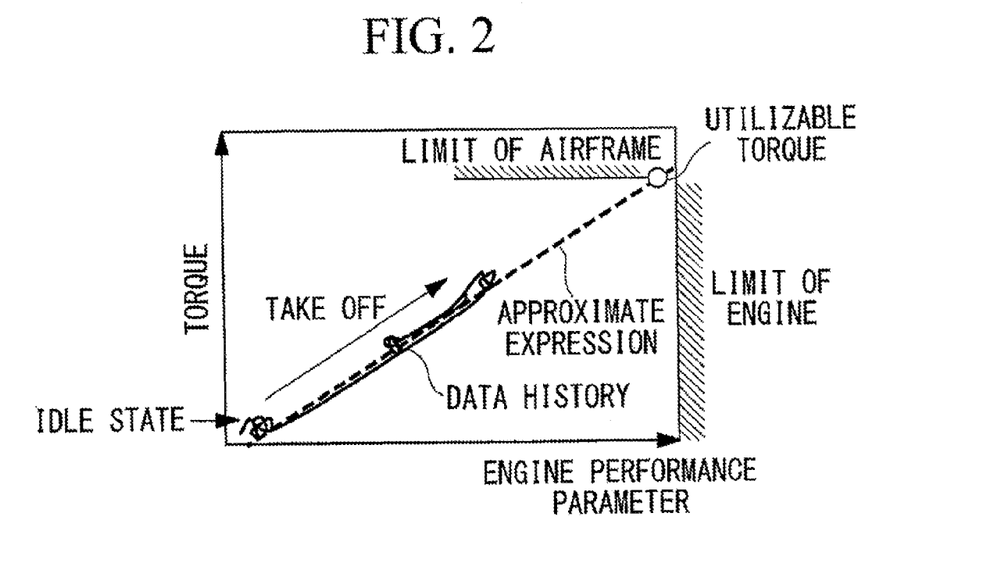
FIG. 2 is a view illustrating an example of an approximate expression that is generated by an approximate expression generation portion according to the embodiment of the present invention.

FIG. 2 is a view illustrating an example of an approximate expression generated by the approximate expression generation portion 16.

The approximate expression generation portion 16 generates an approximate expression based on measurement points (data history) from an idle state of the helicopter 10 that are stored in the storage apparatus 14. The utilizable torque estimation portion 18 then extrapolates the approximate expression, and estimates a utilizable torque based on a limit value that is due to a limit of the aircraft that is determined by the strength of the transmission with respect to the torque, or a limit value that is due to a limit of the engine that is determined by an upper limit of an engine performance parameter.

Figure 3:
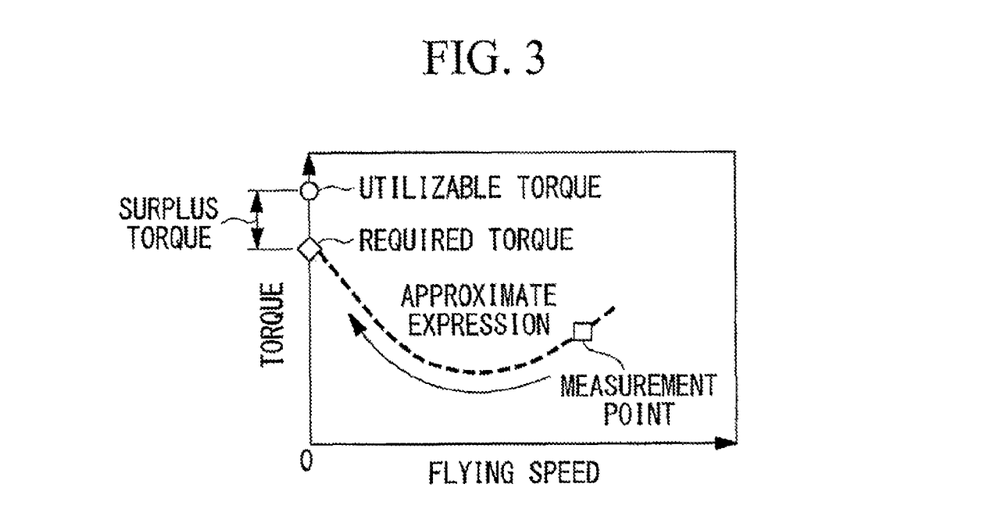
FIG. 3 is a view illustrating a surplus torque according to the embodiment of the present invention.

FIG. 3 is a view that illustrates a surplus torque.

As shown in FIG. 3, the surplus torque is a difference between the utilizable torque and the required torque. In a case where the surplus torque is equal to or less than a previously determined value, the state determining portion 22 determines that the utilizable torque is not sufficient, and notifies the determined result to various notification apparatuses.

More specifically, the torque estimation apparatus 12 is constituted by the storage apparatus 14, a CPU (central processing unit), and a RAM (random access memory) or the like. A series of processes for realizing various functions of the approximate expression generation portion 16, the utilizable torque estimation portion 18, the load apparatus usage state identification portion 20, the state determining portion 22, and the required torque estimation portion 24 are, as one example, recorded in the form of a program in the storage apparatus 14. Various functions are realized by the CPU reading out the program to the RAM or the like, and executing processing to manipulate and calculate information.

Figure 4:
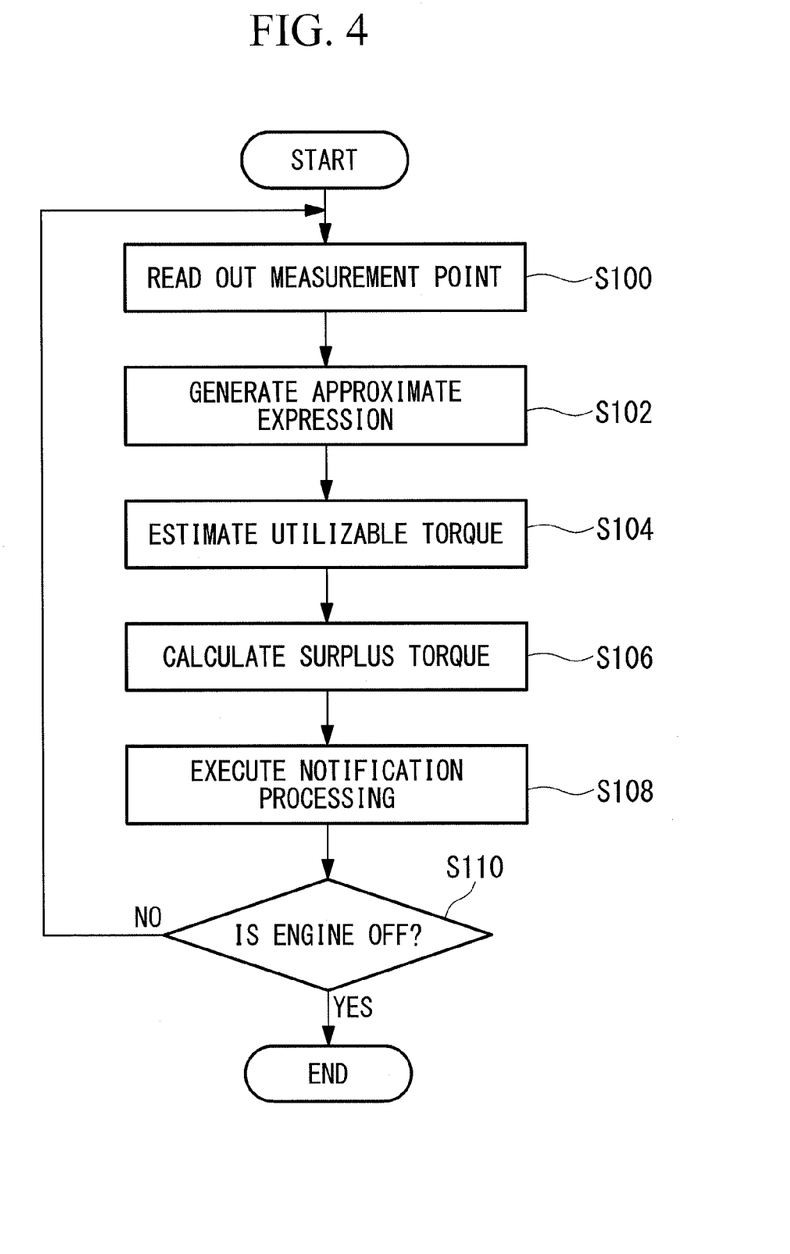
FIG. 4 is a flowchart illustrating the flow of processing of a torque estimation program according to the embodiment of the present invention.

FIG. 4 is a flowchart illustrating a flow of processing of a torque estimation program that is executed by the torque estimation apparatus 12. The torque estimation program is previously stored in a predetermined region of the storage apparatus 14 as described above.

First, in step 100, the torque estimation apparatus 12 reads out stored measurement points from the storage apparatus 14. In the present embodiment, as measurement points, the torque estimation apparatus 12 reads out a turbine temperature with respect to a torque, an engine speed with respect to a torque, and a fuel flow rate with respect to a torque, together with the times at which the corresponding measurements were taken.

Next, in step 102, approximate expressions are generated based on the measurement points that were read out. The approximate expression generation portion 16 generates an approximate expression that is based on a turbine temperature with respect to a torque (hereunder, referred to as "turbine temperature approximate expression"), an approximate expression that is based on an engine speed with respect to a torque (hereunder, referred to as "engine speed approximate expression"), and an approximate expression that is based on a fuel flow rate with respect to a torque (hereunder, referred to as "fuel flow rate approximate expression"). Thus, the approximate expression generation portion 16 generates an approximate expression for each of the plurality of kinds of engine performance parameters that were read out.

Next, in step 104, the utilizable torque is estimated. The utilizable torque estimation portion 18 estimates a utilizable torque by extrapolation for each of the approximate expressions that were generated for each of the plurality of kinds of engine performance parameters. Further, the utilizable torque estimation portion 18 selects the lowest value among the plurality of utilizable torques that were obtained for each of the various kinds of engine performance parameters to thereby obtain a margin of safety.

Next, in step 106, a surplus torque is calculated by subtracting the required torque from the estimated utilizable torque.

Next, in step 108 notification processing is performed that is based on the amount of the surplus torque.

As the notification processing, the torque estimation apparatus 12 causes the display apparatus 44 to display, for example, a diagram as shown in FIG. 2, the estimated utilizable torque, the required torque, and the surplus torque or the like.

Further, as the notification processing, in a case where, for example, the surplus torque is less than a reference value, or a case where the surplus torque is changing so as to decrease with time or the like, the torque estimation apparatus 12 notifies information that indicates that the surplus torque is decreasing by sound through the speaker 42 and/or displays such information on the display apparatus 44. In particular, it is preferable that the torque estimation apparatus 12 performs the aforementioned notification in a case where the helicopter 10 changed from an idling state to take off and then a hovering state, and in a case where the helicopter 10 changed from a cruising state in which the level of torque is low to a flying state that requires a high level of torque such as hovering.

Furthermore, when performing a landing operation such as at a time of a decelerated approach, the torque estimation apparatus 12 may cause the display apparatus 44 to display a recommended landing method based on the amount of the surplus torque. Further, when the amount of surplus torque is small, the torque estimation apparatus 12 may cause the display apparatus 44 to display a message to recommend washing the helicopter 10 with water after landing.

In addition to the foregoing cases, the display apparatus 44 displays changes over time in the utilizable torque and surplus torque or the like in response to a request from the pilot or the maintenance personnel.

Since information based on the estimated amount of the utilizable torque of the engine 28 is notified to the pilot in this manner, the pilot can fly the helicopter 10 in accordance with the utilizable torque, and thus the safety of the helicopter 10 is improved.

Next, in step 110, it is determined whether or not the engine 28 has been stopped. If the result determined in step 110 is affirmative, the present program ends. On the other hand, if the result determined in step 110 is negative, the process shifts to step 100 to read out measurement points that were newly measured, and repeat the processing to generate approximate expressions and estimate a utilizable torque.

Next, the details of the processing performed by the approximate expression generation portion 16 and the utilizable torque estimation portion 18 (processing performed in step 102 and step 104) are described taking as an example a case in which the turbine temperature is mainly adopted as an engine performance parameter. Note that FIG. 5 to FIG. 11 that are used in the following description illustrate one example, and the present invention is not limited thereto. Further, although a method for estimating the utilizable torque using a graph is described hereunder, it is not necessary to perform processing to actually plot measurement points on a graph or the like when estimating a utilizable torque.

First, the turbine temperature and the torque are cross-plotted (measurement points are plotted) in real time, and displayed on a graph.

Figure 5:
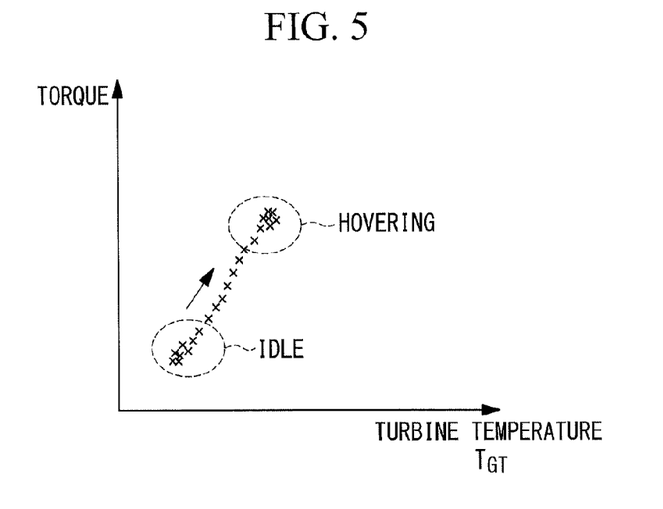
FIG. 5 illustrates an example of a graph on which measurement points according to the embodiment of the present invention are plotted.

In the example shown in FIG. 5, the x-axis represents the turbine temperature and the y-axis represents the torque. For example, in a case where the helicopter 10 transitioned from an idle state of the engine 28 to a hovering state (in ground effect), as shown in FIG. 5, measurement points ("x" marks in FIG. 5) are plotted in a manner in which the measurement points ascend towards the right, and it is understood that the state is one in which the torque increases as the turbine temperature rises.

Figure 6:
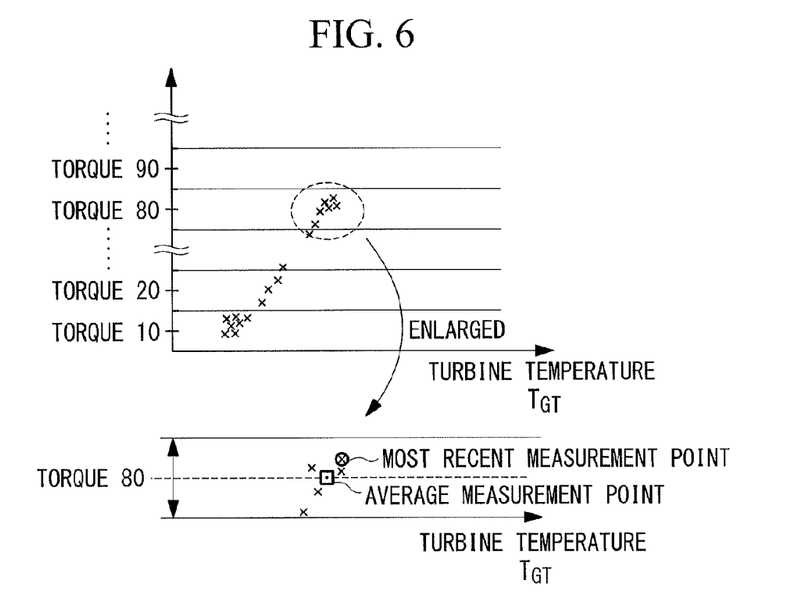
FIG. 6 is an example of a graph in which amounts of torque are divided at every 10 units according to the embodiment of the present invention.

Further, as shown in FIG. 6, for respective amounts of the torque that have been divided into a plurality of segments, the approximate expression generation portion 16 calculates an average value of measurement points for each predetermined time interval. FIG. 6 illustrates an example in which the amounts of the torque are divided at every 10 units, and an enlarged view illustrates an example of measurement points in a segment that is centered on a torque of 80.

In each segment, only in the case where measurement points exist in the relevant segment, the turbine temperature is averaged based on a set of measurement points obtained within a predetermined time period from the most recent measurement point, and the obtained average values are taken as the most recent turbine temperatures for the respective segments.

Since measurement points are averaged for a plurality of segments according to the amount of the torque in this manner, the distribution of the measurement points is made uniform. Further, even in the case of torque amounts in the same segment, the engine performance changes in accordance with differences in the relevant times, and variations arise among the measurement points. Therefore, an average value of measurement points is calculated for each predetermined time interval.

Further, even when the torque is the same, the engine performance declines as the measured value of the engine performance parameter (turbine temperature in the present example) increases.

Figure 7:
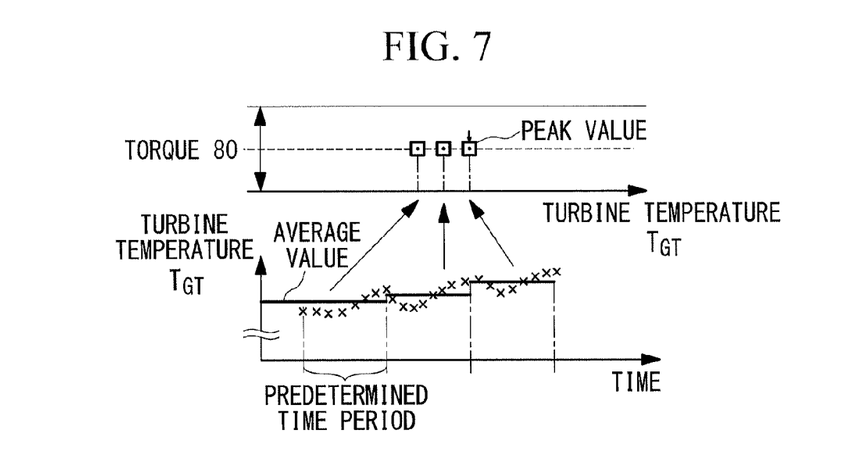
FIG. 7 is an example of a graph showing peak values according to the embodiment of the present invention.

Therefore, as shown in FIG. 7, the approximate expression generation portion 16 uses the largest average value of the turbine temperature among the average values of the same segment as a measurement point (hereunder, referred to as a "peak value") for generating the approximate expression. As a result, the approximate expression that is generated is an approximate expression that has a greater margin of safety.

The peak value is stored in the storage apparatus 14 together with a time at which the measurement point that is taken as the peak value was measured (for example, a center value of the predetermined time interval). Further, as shown in the example in FIG. 8, even if measurement points temporarily leave the segment centered on the torque of 80, when the measurement points enter the segment centered on the torque of 80 again the approximate expression generation portion 16 repeats the processing to calculate average values of the measurement points and calculate a peak value, and then updates the peak value.

Figure 8:
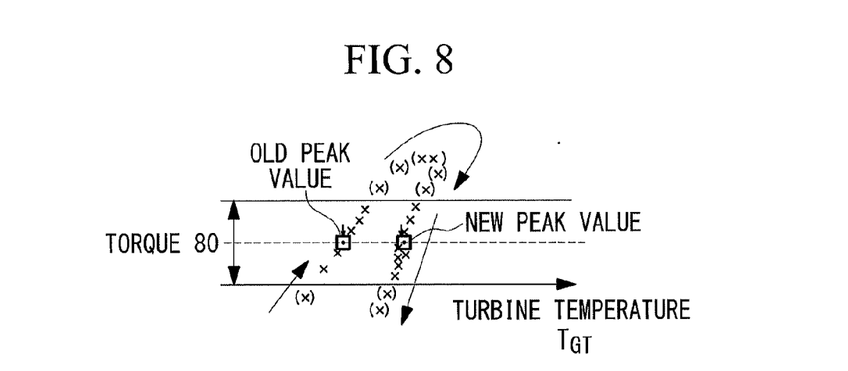
FIG. 8 is an example of a graph that illustrates the updating of a peak value according to the embodiment of the present invention.

Note that, although a segment in which the torque is 80 is taken as an example in the above description, similar processing is also performed for the other segments.

Figure 9:
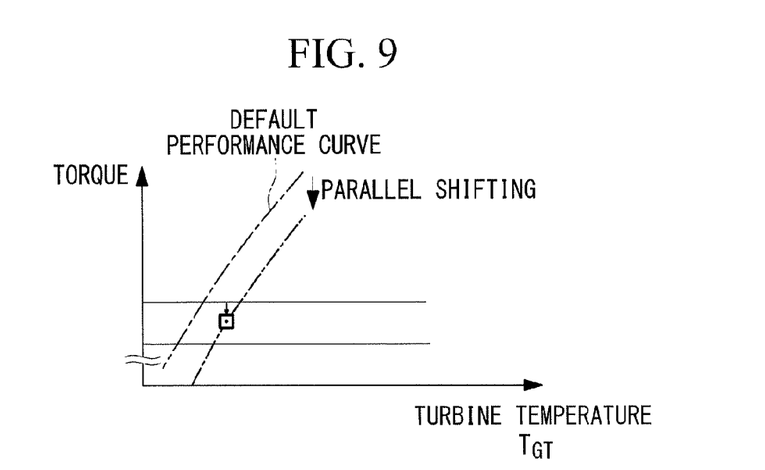
FIG. 9 is a graph that illustrates an example of parallel shifting of a performance curve that is an approximate expression according to the embodiment of the present invention.

Next, when a peak value of any segment is obtained for the first time after the engine 28 was started, as shown in FIG. 9, the approximate expression generation portion 16 parallelly shifts an approximate expression that shows the performance of the engine 28 that was previously obtained (a default performance curve) so as to pass through an obtained peak value. The parallelly shifted approximate expression is stored in the storage apparatus 14 together with the current time.

In a case where a predetermined number of peak values are not obtained, as described later, since an approximate expression cannot be generated, the performance curve that is an approximate expression obtained by measurement or simulation of the engine performance in advance is parallelly shifted to an obtained measurement point. Thus, even if a predetermined number of peak values are not obtained, the torque estimation apparatus 12 can estimate the amount of the utilizable torque. Note that an approximate expression obtained during the previous flight may be used instead of the performance curve.

Note that although the approximate expression may be parallelly shifted in either of the turbine temperature direction (x-axis direction in the graph) and the torque direction (y-axis direction in the graph), it is preferable to parallelly shift the approximate expression in the torque direction so that the utilizable torque that is estimated has a greater margin of safety.

Figure 10:
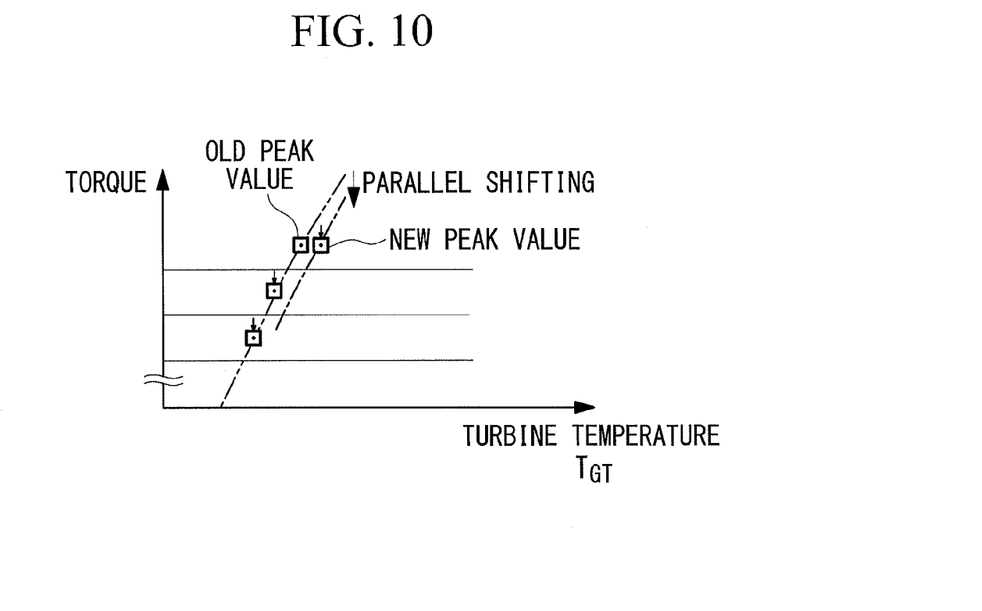
FIG. 10 is a graph that illustrates an example of parallel shifting of an approximate expression in a case where a peak value at which a turbine temperature is high is newly obtained according to the embodiment of the present invention.

In a case where a peak value at which the turbine temperature is high relative to the approximate expression is newly obtained, the approximate expression generation portion 16 parallelly shifts the approximate expression based on the newly obtained peak value.

The fact that the turbine temperature is high relative to the approximate expression indicates that there is a decrease in the torque with respect to the turbine temperature, that is, indicates that the engine performance is declining. For example, in a gas turbine engine, if seawater or volcanic ash or the like is drawn into the engine, there is the possibility that salt lumps or ash will attach to the blade cascades inside the gas turbine engine and the engine performance will decline.

Note that the slope of the approximate expression shows the rate of change in the engine performance with respect to the turbine temperature, and it is considered that the rate of change does not fluctuate significantly even if the engine performance changes. Therefore, an approximate expression that is in accordance with the decline in the engine performance can be easily obtained by parallelly shifting the approximate expression based on newly obtained measurement points.

FIG. 10 is a graph illustrating an example in which the approximate expression is parallelly shifted in a case where a peak value at which the turbine temperature is higher is newly obtained. As shown in FIG. 10, although the approximate expression may be parallelly shifted so as to pass through the new peak value, for example, a configuration may also be adopted in which the approximate expression is parallelly shifted or the like so that the approximate expression passes between the new peak value and the old peak value.

The approximate expression after parallel shifting is stored in the storage apparatus 14 together with the current time.

Figure 11:
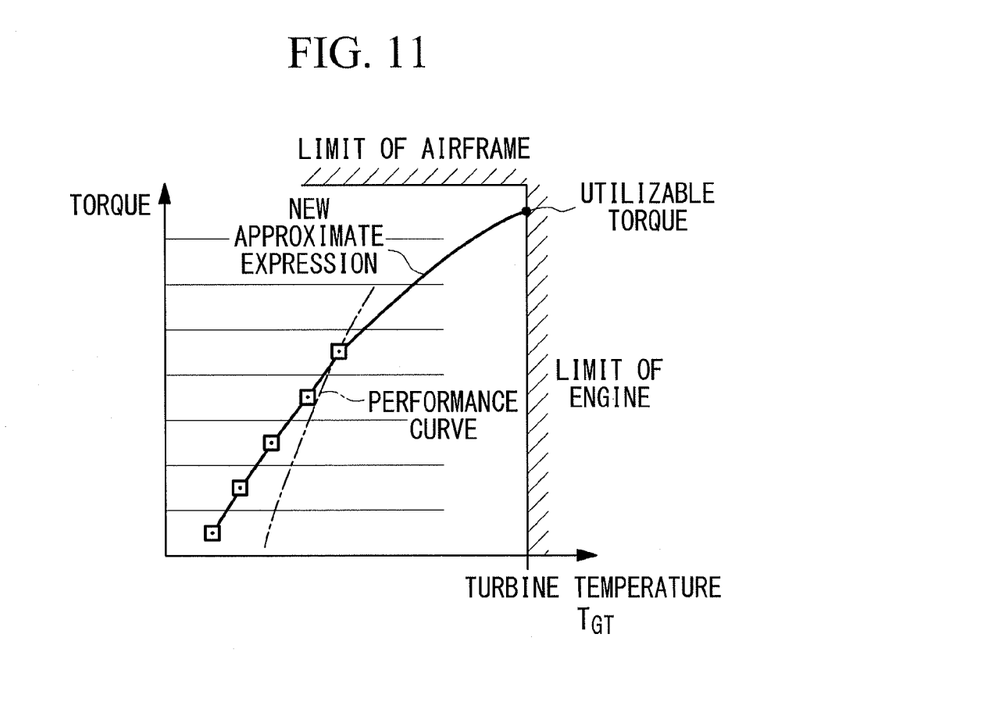
FIG. 11 is a graph that illustrates an example in a case where an approximate expression is newly generated according to the embodiment of the present invention.

Further, in a case where a predetermined number of peak values that are accordance with a torque that is greater than a torque when the engine 28 is in an idling state are obtained, the approximate expression generation portion 16 generates an approximate expression based on the peak values.

Since there is a possibility that a large error will arise in the case of an approximate expression that is generated based on only peak values in an idling state or a small number of peak values, the amount of the utilizable torque cannot be estimated with a high degree of accuracy in such a case. Therefore, the approximate expression generation portion 16 estimates the amount of the utilizable torque with a higher degree of accuracy by generating an approximate expression based on a torque that is greater than a torque in an idling state or based on a predetermined number of measurement points with respect to which an error becomes sufficiently small. Note that the term "torque that is greater than a torque in an idling state" refers to, for example, a torque of an amount that is equal to or greater than the amount of a torque in a case where the helicopter 10 is hovering in ground effect.

When the amount of a torque is equal to or greater the amount of a torque in a case where the helicopter 10 is hovering in ground effect, the values of measurement points are stable and errors due to a first order lag element of the turbine temperature sensor 32 and errors due to other disturbances are excluded from the measured turbine temperatures.

FIG. 11 is a graph illustrating an example in a case where a new approximate expression is generated based on a peak value.

As shown in FIG. 11, the utilizable torque estimation portion 18 extrapolates the approximate expression and, based on the turbine temperature, estimates a point at which a limit value that is due to a limit of the engine 28 or a limit value that is due to a limit of the aircraft is reached as the utilizable torque.

The torque estimation apparatus 12 according to the present embodiment generates the aforementioned approximate expression with respect to the engine speed and the fuel flow rate and the like as well as the turbine temperature to thereby generate a turbine temperature approximate expression, an engine speed approximate expression, and a fuel flow rate approximate expression and the like. The torque estimation apparatus 12 then estimates utilizable torques based on the respective approximate expressions.

Therefore, the utilizable torque estimation portion 18 selects the smallest value among the utilizable torques for the respective engine performance parameters that are based on a limit value that is due to a limit of the aircraft based on the torque, a limit value that is due to a limit of the engine 28 based on the turbine temperature, a limit value that is due to a limit of the engine 28 based on the engine speed, and a limit value that is due to a limit of the engine 28 based on the fuel flow rate, and stores the selected value in the storage apparatus 14 together with the current time.

Next, generation of an approximate expression for each usage state of a load apparatus other than the rotor 26, such as an air conditioner or an anti-icing apparatus, will be described.

The above described approximate expression is generated for each pattern that shows a combination of "on" and "off" states of load apparatuses as shown in the example in Table 1, and a utilizable torque is estimated. The "on" and "off" states of the load apparatuses are identified by the load apparatus usage state identification portion 20.

TABLE 1

| | Load Apparatus Usage State | |
|---|---|---|
| Pattern | Air Conditioner | Anti-icing Apparatus |
| a | Off | Off |
| b | On | Off |
| c | Off | On |
| d | On | On |

Figure 12:
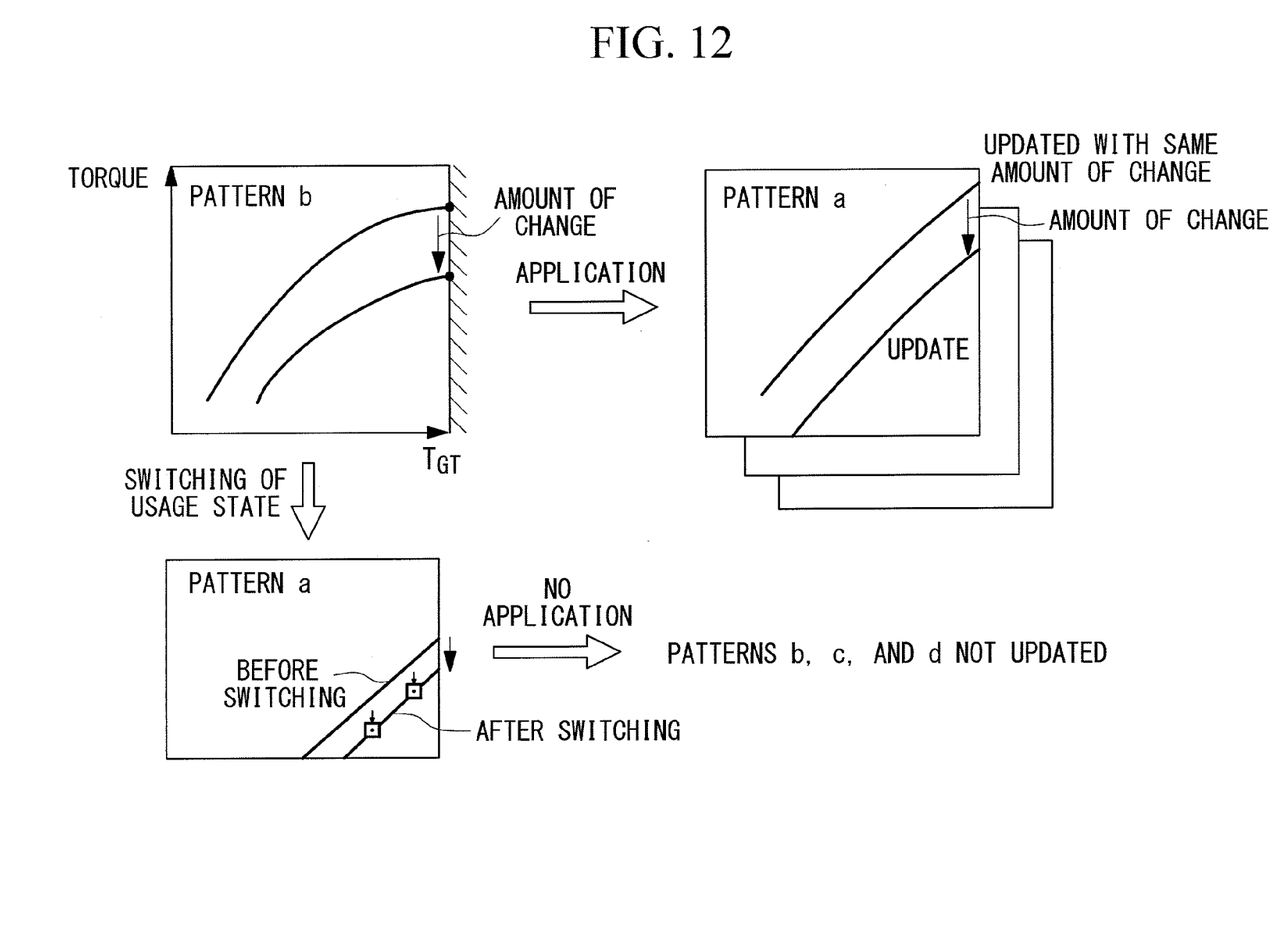
FIG. 12 is a schematic diagram illustrating the contents of updating of an approximate expression with respect to another usage state of a load apparatus in a case where an approximate expression of the load apparatus was updated according to the embodiment of the present invention.

In a case where an approximate expression was updated by being parallelly shifted or the like in a certain usage state of a load apparatus, on the assumption that the same tendency also exists with respect to a relation between the torque and the engine performance parameter in other usage states of the load apparatus, the approximate expression generation portion 16 according to the present embodiment also updates an approximate expression corresponding to other usage states of the load apparatus in a similar manner. As a result, the utilizable torque estimation portion 18 can estimate the amount of the utilizable torque with higher accuracy.

FIG. 12 is a schematic diagram illustrating the contents of updating of an approximate expression for another usage state of a certain load apparatus in a case where an approximate expression of the load apparatus was updated.

As shown in FIG. 12, in a case where an approximate expression for a usage state of a load apparatus as shown, for example, by pattern b was updated, the approximate expression generation portion 16 determines the amount of change in the utilizable torque produced by the updating. Note that, the term "updating of the approximate expression" refers to parallelly shifting an approximate expression or a change to an approximate expression that is newly generated based on the default performance curve.

The approximate expression generation portion 16 then updates approximate expressions of other patterns a, c, and d with the same amount of change as the amount of change determined for the pattern b, and stores the updated approximate expressions.

Note that the approximate expression is also updated when the usage state is switched, similarly to when switching from the pattern a to the pattern b. However, with respect to the update in this case, since the change concerns the usage state, and the performance of the engine 28 has not changed, the approximate expressions of the other patterns are not updated.

Note that the surplus torque changes depending on the usage state of the load apparatus. Therefore, a configuration may be adopted so that, in a case where the surplus torque is small in a certain usage state of the load apparatus, the state determining portion 22 notifies information to the pilot through the speaker 42 or the display apparatus 44 which recommends a usage state of the load apparatus in which the surplus torque increases. A configuration may also be adopted in which, in a case where the surplus torque has become small, the control apparatus of the helicopter 10 automatically switches a usage state of the load apparatus to another usage state in which the surplus torque increases, independently of an operation by the pilot. However, since there is a possibility that switching the anti-icing apparatus from on to off will reduce the safety, automatic switching thereof is not performed.

Figure 13:
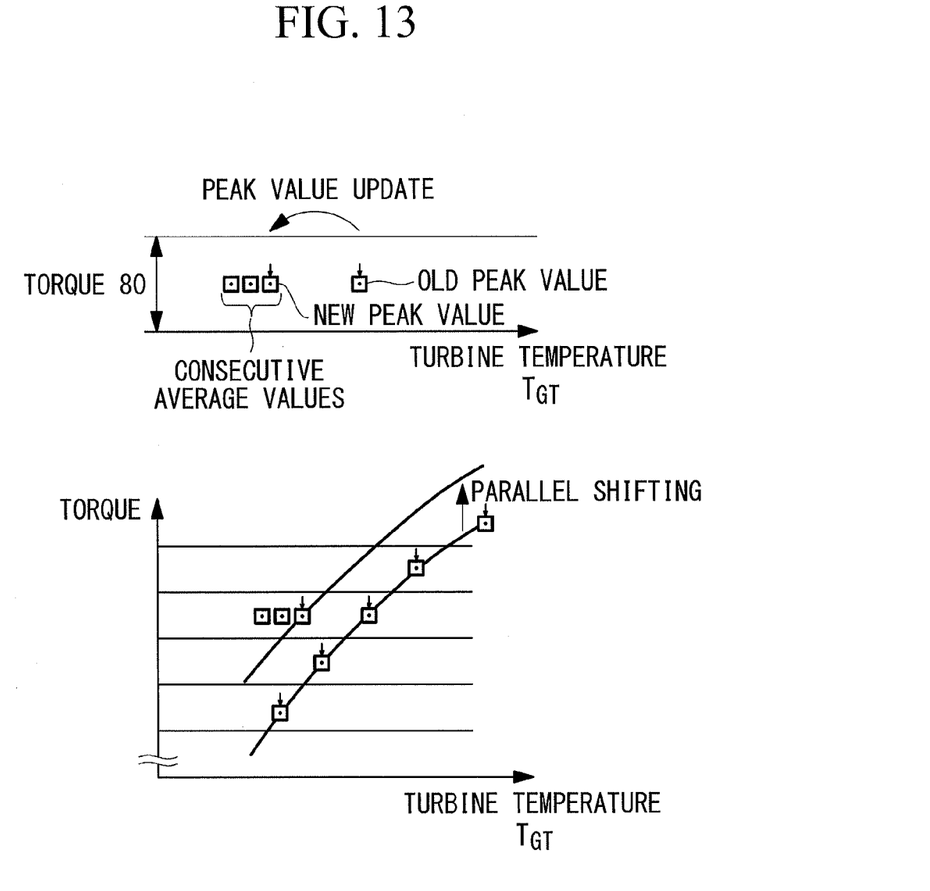
FIG. 13 is a graph that illustrates an example of parallel shifting of an approximate expression in a case where the performance of an engine that had declined is restored according to the embodiment of the present invention.

Next, processing in a case where performance of the engine 28 is restored after the performance had declined will be described.

In a case where a peak value is obtained with respect to which a measured value of the engine performance parameter is low relative to the approximate expression, the approximate expression generation portion 16 parallelly shifts the approximate expression based on the newly obtained peak value. The fact that a measured value of an engine performance parameter is low relative to the approximate expression indicates that there is an increase in the torque with respect to the parameter, that is, that the engine performance is being restored. In the case of a gas turbine engine, even if the engine performance declines due to the engine drawing in seawater or volcanic ash or the like, in some cases salt lumps or ash attached to the blade cascades inside the gas turbine engine is washed off by fresh water such as rain that is drawn into the gas turbine engine, and consequently the engine performance is restored. Further, when maintenance work is performed on the helicopter 10 after landing, salt lumps or ash attached to the blade cascades inside the gas turbine engine is washed off to thereby restore the engine performance.

To exclude the possibility that restoration of the engine performance is a temporary event, as shown in FIG. 13, in a case where average values for which the measured value of an engine performance parameter is low relative to an approximate expression are newly obtained consecutively for a predetermined number of times or more or for a predetermined time period or more, the approximate expression generation portion 16 determines a peak value based on the average values, and parallelly shifts the approximate expression based on the relevant peak value. Thus the approximate expression generation portion 16 can easily obtain an approximate expression that is in accordance with restoration of the engine performance.

The approximate expression after parallel shifting is stored in the storage apparatus 14 together with the current time.

Figure 14:
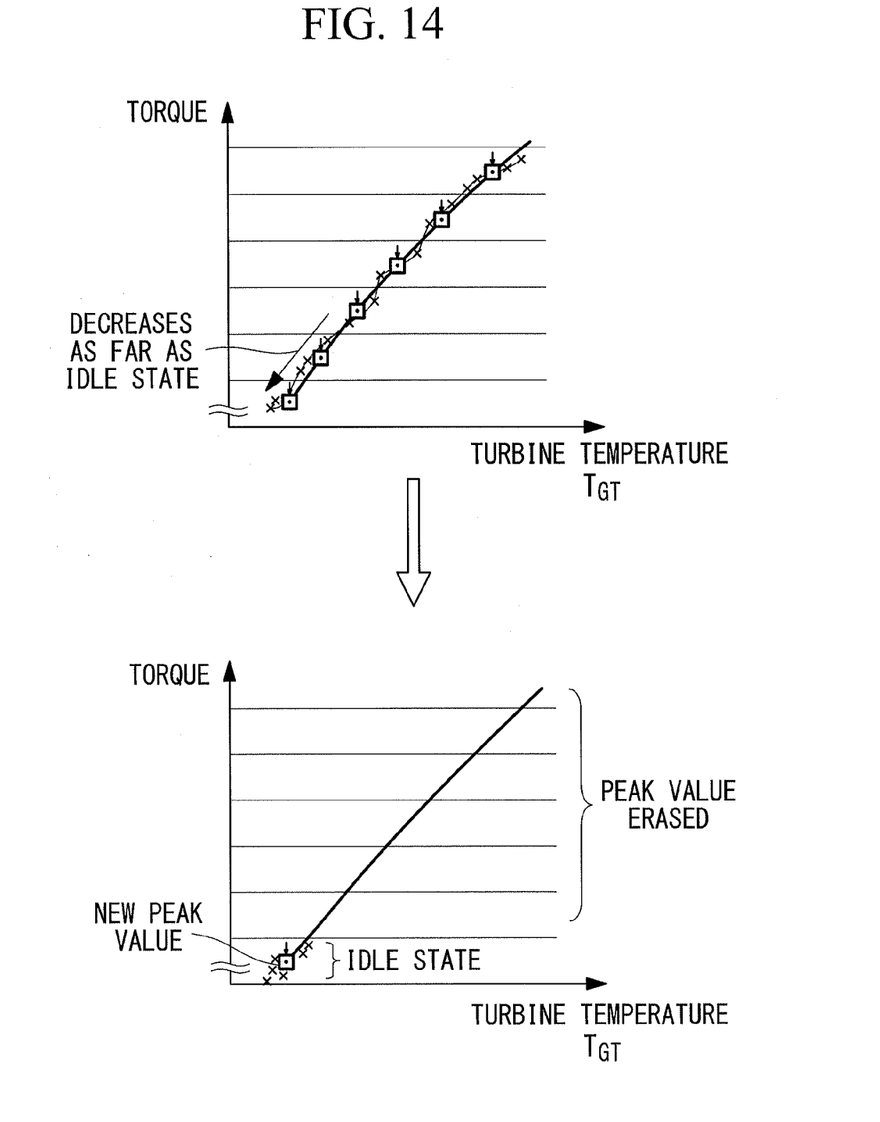
FIG. 14 is a graph that illustrates an example of parallel shifting of an approximate expression in a case where a torque decreases again to a level thereof in an idle state according to the embodiment of the present invention.

In a case where the torque that increased to a higher level than in an idle state decreased to the level thereof in the idle state again, the approximate expression generation portion 16 resets a peak value that was used to generate the approximate expression, and thereafter parallelly shifts the approximate expression based on the newly obtained peak value.

In a case where the torque that increased to a higher level than in an idle state decreases to the level thereof in the idle state again, it can be considered that a flight of the helicopter 10 has ended for the time being.

Therefore, since a measurement point used to generate an approximate expression is reset in a case where torque that increased to a higher level than in an idle state decreased to the level thereof in the idle state again, the influence of a measurement point from the previous flight is reduced with respect to a flight that will be newly started. However, the approximate expression is not reset. Note that, in this case the term "resetting a measurement point" means that the measurement point is not used to generate an approximate expression, and does not mean that the measurement point is deleted from the storage apparatus 14.

Thereafter, as shown in FIG. 14, the approximate expression generation portion 16 parallelly shifts the approximate expression that has not been reset, based on the newly obtained peak value. Hence, when the helicopter 10 is flown for a new flight, the amount of the utilizable torque can be rapidly estimated.

As described above, the torque estimation apparatus 12 of the helicopter 10 according to the present embodiment stores a measurement point that is a measured value of a torque of the engine 28 that rotates the rotor 26 with respect to a measured value of an engine performance parameter that relates to the performance of the engine 28 in the storage apparatus 14 together with the time at which the measurement point was measured, generates an approximate expression based on the measurement point stored in the storage apparatus 14, and estimates the amount of a utilizable torque based on the approximate expression that is generated.

Thus, the torque estimation apparatus 12 generates an approximate expression on the basis of two kinds of information, namely, engine performance parameters obtained from the helicopter 10 and the torque of the engine 28, and thereby estimates the amount of the utilizable torque. Therefore, the amount of the utilizable torque can easily be estimated in real time based on limited engine performance parameters, irrespective of abrupt variations in the engine performance.

While the present invention has been described above using the foregoing embodiment, the technical scope of the present invention is not limited to the scope described in the foregoing embodiment. Various changes or improvements that do not depart from the scope of the invention can be made to the foregoing embodiment, and forms including such modifications or improvements are also included in the technical scope of the present invention.

For example, although a form in which the present invention is applied to the helicopter 10 as a vertical take-off and landing aircraft is described in the foregoing embodiment, the present invention is not limited thereto, and a form may also be adopted in which the present invention is applied to another kind of vertical take-off and landing aircraft, such as a tiltrotor aircraft.

Further, although a form in which the present invention is applied to a vertical take-off and landing aircraft that uses a gas turbine engine is described in the foregoing embodiment, the present invention is not limited thereto, and a form may also be adopted in which the present invention is applied to a vertical take-off and landing aircraft that uses a different kind of air intake type engine such as a reciprocating engine or a rotary engine (Wankel engine).

Furthermore, although in the foregoing embodiment a form is described in which one utilizable torque is selected by measuring a plurality of engine performance parameters and selecting the lowest value from a plurality of utilizable torques that are obtained, the present invention is not limited thereto. A form may also be adopted in which a utilizable torque is estimated based on only one engine performance parameter.

Further, the flow of processing of the torque estimation program described in the foregoing embodiment is one example, and unnecessary steps may be deleted, new steps added, and the order of processing changed within a range that does not deviate from the spirit and scope of the present invention.

REFERENCE SIGNS LIST

10 Helicopter
12 Torque estimation apparatus
14 Storage apparatus
16 Approximate expression generation portion
18 Utilizable torque estimation portion
26 Rotor
28 Engine
42 Speaker
44 Display apparatus

The invention claimed is:

1. A torque estimation apparatus for a vertical take-off and landing aircraft, comprising:
    a storage apparatus that stores a measurement point that is a measured value of a torque being generated by an engine with respect to a measured value of a parameter relating to performance of the engine that rotates a rotor, together with a time at which the measurement point is measured;
    a generation portion that generates an approximate expression which represents a change in performance of the engine based on the measurement point that is stored in the storage apparatus; and
    an estimation portion that estimates the maximum value of a torque which the engine can generate, based on the approximate expression that is generated by the generation portion.

2. The torque estimation apparatus for a vertical take-off and landing aircraft according to claim 1, wherein, in a case where the measurement point with respect to which a measured value of the parameter is high relative to the approximate expression is newly obtained, the generation portion parallelly shifts the approximate expression based on the measurement point that is newly obtained.

3. The torque estimation apparatus for a vertical take-off and landing aircraft according to claim 1, wherein, in a case where the measurement point with respect to which a measured value of the parameter is low relative to the approximate expression is newly obtained consecutively for a predetermined number of times or more or for a predetermined time period or more, the generation portion parallelly shifts the approximate expression based on the measurement point that is newly obtained.

4. The torque estimation apparatus for a vertical take-off and landing aircraft according to claim 1, wherein, in a case where a predetermined number of the measurement points that are in accordance with the torque that is greater than the torque when the engine is in an idling state are obtained, the generation portion generates the approximate expression based on the measurement points.

5. The torque estimation apparatus for a vertical take-off and landing aircraft according to claim 4, wherein, in a case where the predetermined number of the measurement points are not obtained, the generation portion parallelly shifts a predetermined approximate expression to the measurement point that is obtained.

6. The torque estimation apparatus for a vertical take-off and landing aircraft according to claim 1, wherein, for each of a plurality of segments of a divided range of the measurement point, the generation portion calculates an average value of a plurality of the measurement points for each predetermined time interval, and uses a largest average value among the average values calculated by the predetermined time interval as a measurement point for generating the approximate expression in each of the plurality of the segments.

7. The torque estimation apparatus for a vertical take-off and landing aircraft according to claim 1, further comprising a load apparatus provided in the engine and different to the rotor of the engine, wherein the generation portion generates the approximate expression for each usage state of the load apparatus.

8. The torque estimation apparatus for a vertical take-off and landing aircraft according to claim 7, wherein, in a case where the approximate expression that corresponds to a usage state of the load apparatus is updated, the generation portion also similarly updates the approximate expression that corresponds to another usage state of the load apparatus.

9. The torque estimation apparatus for a vertical take-off and landing aircraft according to claim 1, wherein, in a case where the torque that increases to a higher level than in an idle state decreases to a level thereof in the idle state again, the generation portion resets the measurement point that is used to generate the approximate expression, and thereafter parallelly shifts the approximate expression based on the measurement point that is newly obtained.

10. The torque estimation apparatus for a vertical take-off and landing aircraft according to claim 1, comprising a notification portion that notifies information based on the maximum value that is estimated by the estimation portion to a pilot.

11. A computer-readable recording medium in which a torque estimation program for a vertical take-off and landing aircraft is stored, the torque estimation program causing a computer to function as:
    a reading portion that reads out a measurement point that is a measured value of a torque being generated by an engine with respect to a measured value of a parameter relating to performance of the engine that rotates a rotor from a storage apparatus in which the measurement point is stored together with a time at which the measurement point is measured;
    a generation portion that generates an approximate expression which represents a change in performance of the engine based on the measurement point that is read out; and
    an estimation portion that estimates the maximum value of a torque which the engine can generate, based on the approximate expression that is generated by the generation portion.

12. A torque estimation method for a vertical take-off and landing aircraft, including:
    storing a measurement point that is a measured value of a torque being generated by an engine with respect to a measured value of a parameter relating to performance of the engine that rotates a rotor in a storage apparatus together with a time at which the measurement point is measured;
    generating an approximate expression which represents a change in performance of the engine based on the measurement point that is stored in the storage apparatus; and
    estimating the maximum value of a torque which the engine can generate, based on the approximate expression that is generated.

* * * * *